United States Patent
Murasato et al.

(10) Patent No.: US 8,597,813 B2
(45) Date of Patent: Dec. 3, 2013

(54) SECONDARY BATTERY MODULE

(71) Applicant: NGK Insulators, Ltd., Nagoya (JP)

(72) Inventors: Masahiro Murasato, Chita (JP); Takuya Ishihara, Tsushima (JP); Keiichi Wakida, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/663,715

(22) Filed: Oct. 30, 2012

(65) Prior Publication Data

US 2013/0052505 A1 Feb. 28, 2013

Related U.S. Application Data

(63) Continuation of application No. PCT/JP2011/058766, filed on Apr. 7, 2011.

(30) Foreign Application Priority Data

May 12, 2010 (JP) .................................. 2010-110270

(51) Int. Cl.
*H01M 10/50* (2006.01)
*H01M 2/00* (2006.01)

(52) U.S. Cl.
USPC .............................. 429/120; 429/99; 429/163

(58) Field of Classification Search
USPC ..................................... 429/96–100, 120–347
See application file for complete search history.

(56) References Cited

U.S. PATENT DOCUMENTS

| | | | |
|---|---|---|---|
| 2005/0269995 A1* | 12/2005 | Donnelly et al. | 320/150 |
| 2011/0165454 A1* | 7/2011 | Iwamoto et al. | 429/163 |
| 2011/0195291 A1* | 8/2011 | Yokoyama et al. | 429/99 |
| 2012/0028107 A1* | 2/2012 | Sugita et al. | 429/156 |

FOREIGN PATENT DOCUMENTS

| | | |
|---|---|---|
| JP | 09-330738 A1 | 12/1997 |
| JP | 11-185801 A1 | 7/1999 |
| JP | 2001-210292 A1 | 8/2001 |

OTHER PUBLICATIONS

International Search Report dated Jul. 12, 2011.

* cited by examiner

*Primary Examiner* — Basia Ridley
*Assistant Examiner* — James Lee
(74) *Attorney, Agent, or Firm* — Burr & Brown

(57) ABSTRACT

An NaS battery module includes a container, a plurality of cells for an NaS battery and sand. The side walls of the container partition the inside and outside of the container in a direction in which the arrangement plane of the cells extends. An upper wall and a lower wall of the container partition the inside and outside of the container in a direction perpendicular to the direction in which the arrangement plane of the cells extends. The lower wall and the side walls are high heat insulating walls whereas the upper wall is a solid low heat insulating wall having a heat insulating property lower than that of the high heat insulating wall. The cells and the sand are housed inside of the container. A variable louver is disposed outside of the upper wall so as to cover the outer surface of the upper wall.

4 Claims, 5 Drawing Sheets

F I G. 3
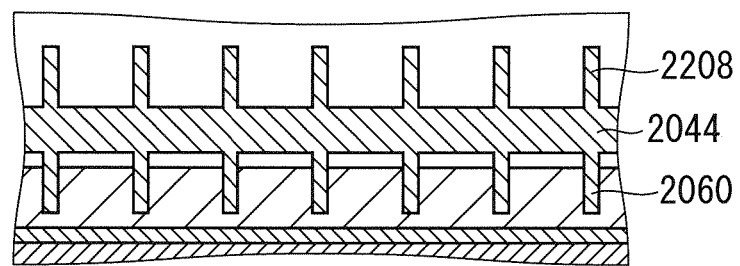
F I G. 4
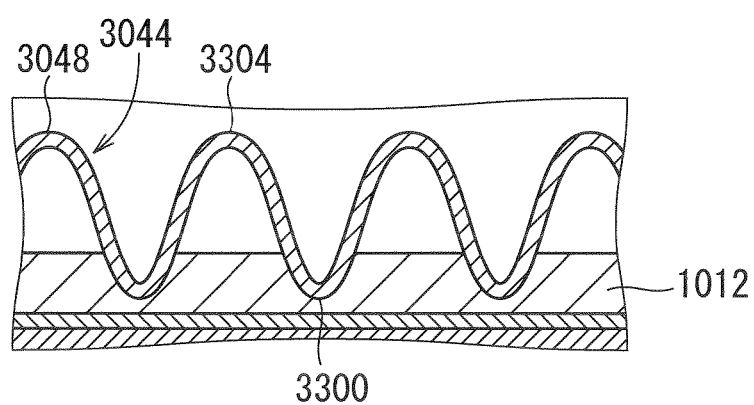

— 1 —

SECONDARY BATTERY MODULE

BACKGROUND OF THE INVENTION

1. Technical Field

The present invention relates to a secondary battery module containing a plurality of cells for a secondary battery inside of a container.

2. Description of Related Art

In a sodium/sulfur battery (hereinafter referred to as "NaS battery") module containing a plurality of cells for an NaS battery inside of a container, operation is performed in the state in which the temperature of the cells is kept at as high as 300° C., and therefore, the cells are mostly contained inside of a heat insulating container. Moreover, gaps between the cells are filled with incombustible sand and an insulating plate is mostly interposed between the cells and the wall of the container in the NaS battery module so as to enhance safety.

In the meantime, the uniform temperature of the cells is required in the NaS battery module. Patent Document 1 proposes arranging cells flat, setting a heat insulating property of an upper wall and/or a lower wall to be lower than that of a side wall, and radiating heat mainly via the upper wall and/or the lower wall so as to achieve the uniform temperature of the cells. Moreover, Patent Document 1 refers to reducing the heat insulating property of the upper wall during electric discharging when an NaS battery generates heat (paragraph 0018).

PRIOR ART DOCUMENT

Patent Document

Patent Document 1: Japanese Patent Application Laid-Open No. 11-185801

SUMMARY OF THE INVENTION

However, in the NaS battery module disclosed in Patent Document 1, the vacancy of a hollow portion defined inside of the upper wall is adjusted so as to reduce the heat insulating property of the upper wall. As a consequence, an air layer is always formed inside of the upper wall, and therefore, it is difficult to sufficiently reduce the heat insulating property of an upper layer, thereby making it difficult to uniformly radiate the heat with high efficiency.

This problem arises in a secondary battery module containing cells for a secondary battery other than the NaS battery inside of a container.

Thus, the present invention has been accomplished to solve this problem. Therefore, an object of the present invention is to provide a secondary battery module in which heat can be uniformly radiated with high efficiency and the temperature of cells can be uniformly maintained.

Means for solving the problem to be solved will be described below.

A first aspect of the present invention relates to a secondary battery module includes: a container; a plurality of cells for a secondary battery, the cells being housed inside of the container and arranged flat; an incombustible filler having fluidity, the filler being contained inside of the container and filling clearances defined between the cells; and a heat radiation amount adjusting mechanism, the container including: one or more first walls for partitioning the inside and outside of the container from each other in a direction in which the arrangement plane of the cells extends; and one or more second walls for partitioning the inside and outside of the container from each other in a direction perpendicular to the direction in which the arrangement plane of the cells extends, the second wall having a solid low heat insulating wall having a heat insulating property lower than that of the first wall, the heat radiation amount adjusting mechanism being provided outside of the low heat insulating wall so as to cover the outer surface of the low heat insulating wall.

According to a second aspect of the present invention, the heat radiation amount adjusting mechanism is a variable louver in the secondary battery module according to the first aspect.

According to a third aspect of the present invention, the heat radiation amount adjusting mechanism is a shutter in the secondary battery module according to the first aspect.

According to a fourth aspect of the present invention, the heat radiation amount adjusting mechanism is a heat insulator whose entire or part can be detached from the outer surface of the low heat insulating wall in the secondary battery module according to the first aspect.

EFFECTS OF THE INVENTION

According to the present invention, even though the inside of a low heat insulating wall is solid, the amount of heat radiation can be adjusted, so that heat can be uniformly radiated with high efficiency, thus uniformly maintaining the temperature of cells.

BRIEF DESCRIPTION OF THE DRAWINGS

FIG. 3 is a cross-sectional view showing an upper wall and its surroundings in a second preferred embodiment.

FIG. 4 is a cross-sectional view showing an upper wall and its surroundings in a third preferred embodiment.

DETAILED DESCRIPTION OF THE INVENTION

First Preferred Embodiment (Outline)

A first preferred embodiment relates to an NaS battery module 1000.

Figure 1:
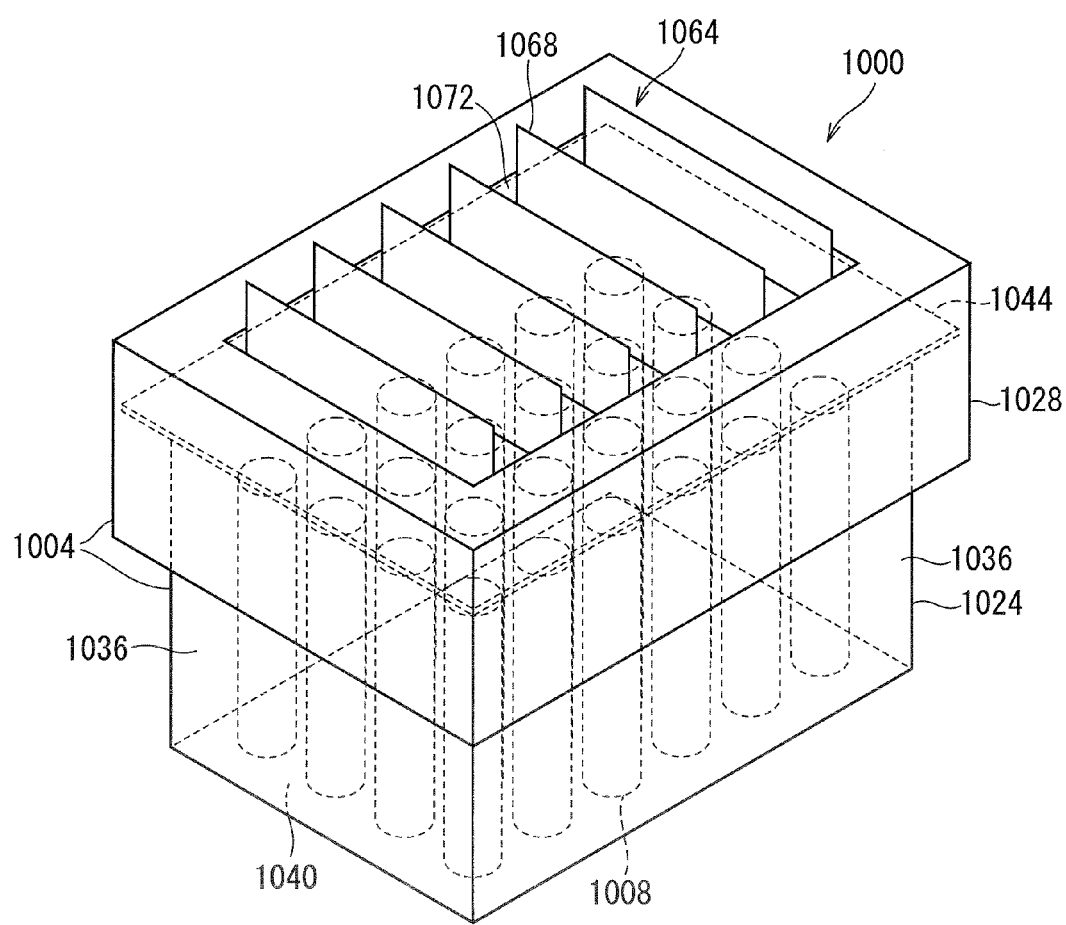
FIG. 1 is a perspective view showing an NaS battery module in a first preferred embodiment.
Figure 2:
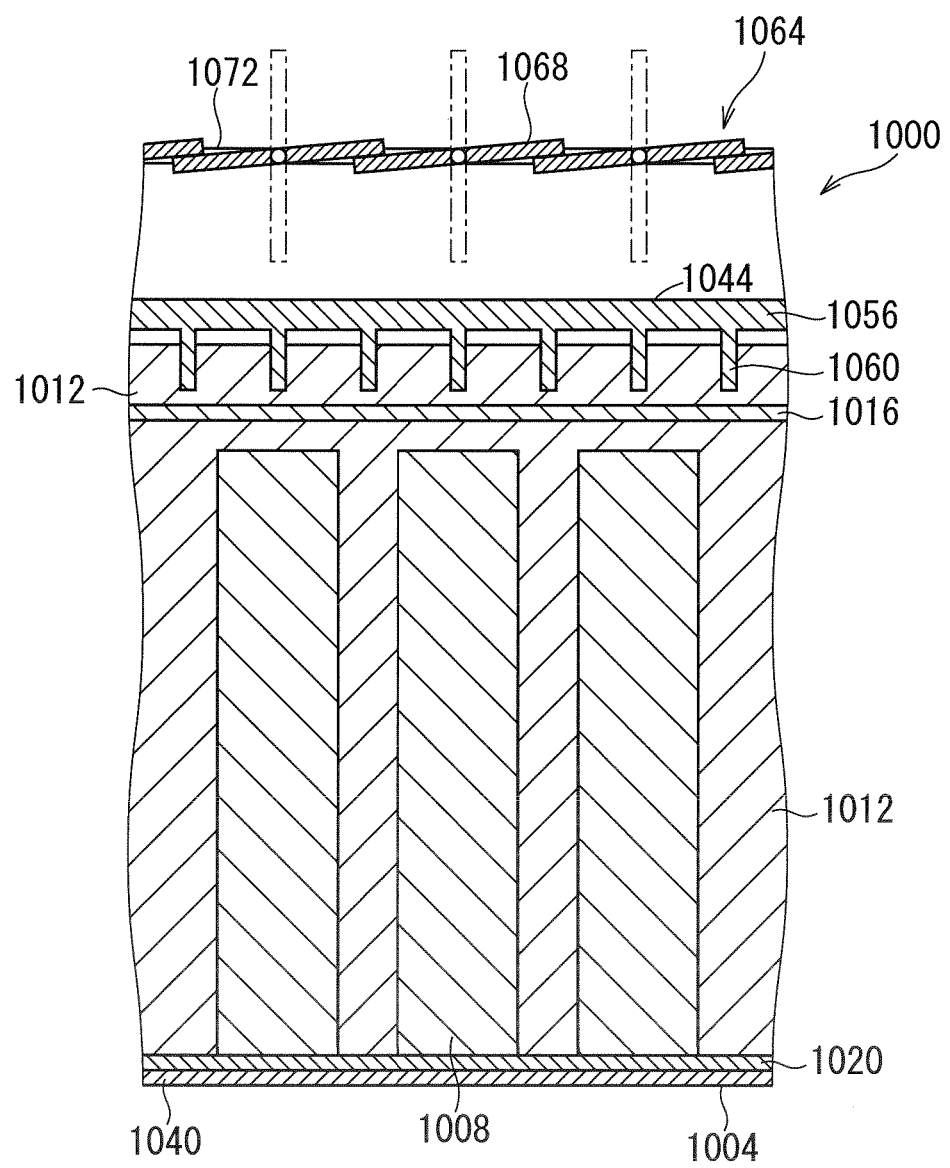
FIG. 2 is a cross-sectional view showing the NaS battery module in the first preferred embodiment.

FIGS. 1 and 2 are schematic views showing the NaS battery module 1000 in the first preferred embodiment, wherein FIG. 1 is a perspective view and FIG. 2 is a cross-sectional view.

As shown in FIGS. 1 and 2, the NaS battery module 1000 includes a container 1004, a plurality of cells 1008 for an NaS battery, sand 1012, a mica plate 1016, and another mica plate 1020. The cells 1008, the sand 1012, the mica plate 1016, and the mica plate 1020 are contained inside of the container 1004. A heater, a temperature sensor, and the like may be housed inside of the container 1004. In the NaS battery module 1000, the tip of a fin 1060 projecting from an upper wall 1044 of the container 1004 sticks the sand 1012, and further, the mica plate 1016 is embedded in the sand 1012, thereby radiating heat through mainly the upper wall 1044. The amount of radiated heat passing through the upper wall 1044 is adjusted by a variable louver 1064 covering the outer surface of the upper wall 1044.

The cells 1008 are flat arranged on the mica plate 1020 laid on the inner surface of a lower wall 1040 of the container 1004. Here, the "flat arrangement" indicates arranging the cells 1008 along a flat arrangement plane.

Gaps defined between the cells 1008 are filled with the sand 1012. The sand 1012 may be either natural or artificial or in combination thereof as long as it is incombustible. Filling the sand 1012 can enhance safety of the NaS battery module 1000. In place of the sand 1012, the gaps may be filled with an incombustible filler having fluidity.

The mica plate 1016 and the mica plate 1020 are parallel to the arrangement plane of the cells 1008. The mica plate 1016 is interposed between the cells 1008 and the upper wall 1044; in contrast, the mica plate 1020 is interposed between the cells 1008 and the lower wall 1040. Consequently, the cells 1008 are shielded with the mica plate 1016 and the mica plate 1020, thereby enhancing the insulating property of the NaS battery module 1000. The mica plate 1016 and the mica plate 1020 are made of a plate-like mica insulator. The plate-like mica plates 1016 and 1020 may be replaced with sheet-like mica sheets. The insulator may be made of materials other than mica. Here, the mica insulator has not only incombustibility but also excellent heat conductivity, and therefore, it contributes to improvement in safety and efficiency of heat radiation.

(High Heat Insulating Wall and Low Heat Insulating Wall)

As shown in FIGS. 1 and 2, the container 1004 includes: a main body 1024 provided with side walls 1036 and the lower wall 1040; and a cover 1028 provided with the upper wall 1044. The side walls 1036 are adapted to partition the inside and outside of the container 1004 in a direction in which the arrangement plane of the cells 1008 extends. In the meantime, the upper wall 1044 and the lower wall 1040 are designed to partition the inside and outside of the container 1004 in a direction perpendicular to the direction in which the arrangement plane of the cells 1008 extends. The lower wall 1040 and the side walls 1036 have a high heat insulating property; in contrast, the upper wall 1044 has a low heat insulating property lower than that of the high heat insulating wall. As a consequence, it is possible to relatively suppress the heat radiation in the direction in which the arrangement plane of the cells 1008 extends whereas to relatively promote the heat radiation in the direction perpendicular to the direction in which the arrangement plane of the cells 1008 extends, thus achieving the uniform temperature of the cells 1008. Although the side walls 1036 are typically perpendicular to the arrangement plane of the cells 1008, they may be slightly inclined in the direction perpendicular to the arrangement plane of the cells 1008. Although the upper wall 1044 and the lower wall 1040 are typically parallel to the arrangement plane of the cells 1008, they may be slightly inclined in the direction parallel to the arrangement plane of the cells 1008. When a heater is housed inside of the container 1004, it is desirable that a panel heater should be disposed along the inner surface of the high heat insulating wall.

In the case where the side walls 1036 and the lower wall 1040 have the high heat insulating property, it is desirable to adopt a vacuum heat insulating structure in which a hollow portion should be defined inside of the side walls 1036 and the lower wall 1040 and then should be evacuated. In place of or in addition to the adoption of the vacuum heat insulating structure, the inner surfaces and/or outer surfaces of the side walls 1036 and/or lower wall 1040 are covered with a heat insulating material, thus constituting the high heat insulating walls of the side walls 1036 and/or lower wall 1040 and the heat insulating material. Although the heat insulating material is not particularly limited, it is generally a mat made of a fiber aggregate or a foaming member.

In addition to or in place of the upper wall 1044, the lower wall 1040 may be a low heat insulating wall. More generally, one or more walls for partitioning the inside and outside of the container 1004 in the direction perpendicular to the direction in which the arrangement plane of the cells 1008 extends may have a low heat insulating property, and it may have the heat insulating property lower than that of one or more walls for partitioning the inside and outside of the container 1004 in the direction in which the arrangement plane of the cells 1008 extends. When the upper wall 1044 has the low heat insulating property, there is an advantage of efficient heat radiation owing to convection. In the conventional NaS battery module typified by Patent Document 1 (Japanese Patent Application Laid-Open No. 11-185801), in the case where the upper wall has the low heat insulating property, there has arisen a problem that the air layer defined between the upper wall and the sand prevents heat conduction; in contrast, in the NaS battery module 1000 in the first preferred embodiment, the problem can be solved by the heat conducting structure of the low heat insulating wall and the embedded mica plate 1016.

From the viewpoints of the efficient heat radiation and improved uniformity, it is most desirable that the entire upper wall 1044 falls under a low heat insulating region having the heat insulating property lower than that of the side walls 1036; however, only a part of the upper wall 1044 may serve as a low heat insulating region as long as the low heat insulating region encompasses a region in which the cells 1008 are arranged, as viewed in the direction perpendicular to the direction in which the arrangement plane of the cells 1008 extends. In the case where, for example, the container 1004 is large, and farther, the cells 1008 are centralized at the container 1004, as viewed in the direction perpendicular to the direction in which the arrangement plane of the cells 1008 extends, the center of the upper wall 1044 may serve as the low heat insulating region but the edge may not serve as the low heat insulating region.

More generally, the low heat insulating wall has the low heat insulating region having the heat insulating property lower than that of the wall for partitioning the inside and outside of the container 1004 in the direction in which the arrangement plane of the cells 1008 extends, and further, the low heat insulating region may encompass a region having the cells 1008 arranged therein, as viewed in the direction perpendicular to the direction in which the arrangement plane of the cells 1008 extends.

It is not essential that the container 1004 is formed into a rectangular shape shown in FIG. 1. Specifically, the container 1004 may be formed into shapes other than the rectangular shape such as a columnar shape. Consequently, the side walls 1036 are not limited to a flat shape. In the same manner, the upper wall 1044 and the lower wall 1040 are not limited to the flat shape; however, in order to achieve the uniform heat radiation, it is desirable that the upper wall 1044 and the lower wall 1040 should be flat and parallel to the arrangement plane of the cells 1008.

(Heat Conducting Structure of Low Heat Insulating Wall)

As shown in FIG. 2, the solid upper wall 1044 having no hollow portion serving as the low heat insulating wall is a top plate of an integral structure having the fins 1060 at its inner surface (i.e., its lower surface). When the lower wall 1040 is the low heat insulating wall, the lower wall 1040 is a bottom plate of an integral structure having fins at its inner surface (i.e., its upper surface). Here, the "integral structure" indicates a structure not having an interface joined via joint means such as screwing, bonding, welding, and soldering at least in a thickness direction. The low heat insulating wall has the integral structure, thereby eliminating an interface that interferes with heat conduction, so as to efficiently radiate the heat.

The plurality of fins 1060 project toward the inside of the container 1004, and therefore, the tip of each of the fins 1060 sticks the sand 1012. Consequently, the heat can be uniformly conducted with high efficiency, and further, the heat can be uniformly radiated with high efficiency, and therefore, the temperature of the cells 1008 becomes uniform. This can not only prevent any degradation of the cells 1008 and achieve the uniform charging/discharging capacity but also facilitate increasing the number and size of the cells 1008, and further, can facilitate increasing the size of the NaS battery module 1000. A clearance may be defined between a base 1056 and the sand 1012.

The reason why the heat is uniformly radiated by this heat conducting structure is that the inner surface of the top plate is markedly brought into non-uniform contact with the sand 1012 and the heat is markedly non-uniformly radiated in the case where the flat inner surface of the top plate is brought into direct contact with the sand 1012 whereas this problem is solved according to this heat conducting structure.

The material of the upper wall 1044 should be desirably a high heat conductor, such as aluminum and copper, having a heat conductivity satisfactorily higher than that of the sand 1012. This is because when the upper wall 1044 is made of a high heat conductor, the efficiency and uniformity of the heat radiation can be hardly decreased.

The fins 1060 can be only distributed at the inner surface of the upper wall 1044, although it is desirable they should be uniformly distributed at the inner surface of the upper wall 1044. As a consequence, the heat can be further uniformly radiated.

The fin 1060 may be of a plate type having a plate-like shape, of a pin type having a rod-like shape, or of other types.

(Embedding Mica Plate 1016)

As shown in FIG. 2, the mica plate 1016 interposed between the cells 1008 and the upper wall 1044 being the lower heat insulating wall is embedded in the sand 1012. Here, "embedded" indicates bringing the entire surface of the mica plate 1016 into contact with the sand 1012 but not exposing the surface of the mica plate 1016 to the outside of the sand 1012. In this manner, the insulating property of the NaS battery module 1000 is enhanced while the tip of the fin 1060 can stick the sand 1012, thereby preventing an increase in air layer formed between the sand 1012 and the upper wall 1044, so as to uniformly radiate the heat with high efficiency.

(Installation of Heat Radiation Amount Adjusting Mechanism)

The variable louver 1064 is located outside of the upper wall 1044 being the lower heat insulating wall so as to cover the outer surface of the upper wall 1044. The "louver" may be called also a "blind" or the like. The variable louver 1064 constitutes a heat radiation amount adjusting mechanism for turning a blade 1068 around a rotary axis and adjusting the heat radiation amount between the state in which an opening 1072 is opened to increase heat radiation amount and the state in which the opening 1072 is closed to decrease the heat radiation amount. In this manner, the openings 1072 formed on a heat radiation path from the upper wall 1044 are opened or closed, so that the heat radiation amount can be adjusted.

The variable louver 1064 can adjust the heat radiation amount, and when it is necessary to decrease the temperature of the inside of the container 1004, the heat radiation amount is increased; in contrast, when it is unnecessary to decrease the temperature of the inside of the container 1004, the heat radiation amount is decreased; as a consequence, the temperature of the inside of the container 1004 can be properly maintained.

For example, in the NaS battery module 1000, the heat radiation amount is increased during electric discharging when heat generation from the NaS battery becomes large. When the NaS battery is replaced with a secondary battery in which heat generation becomes large during electric charging, the heat radiation amount is increased during the electric charging when heat generation from the secondary battery becomes large.

The variable louver 1064 may be replaced with heat radiation amount adjusting mechanisms other than the variable louver 1064. Here, the maximum opening ratio of the variable louver 1064 can be about 90%, and therefore, the use of the variable louver 1064 is desirable in the case of demanding the large heat radiation amount.

(Omission of Any of Heat Conducting Structure of Low Heat Insulating Wall, Embedding Mica Plate 1016, and Installation of Heat Radiation Amount Adjusting Mechanism)

Although it is most desirable that the heat conducting structure of the low heat insulating wall, embedding the mica plate 1016, and the installation of the heat radiation amount adjusting mechanism should be adopted at the same time, the significance cannot be completely lost even though any of these is omitted.

Second Preferred Embodiment

A second preferred embodiment relates to an upper wall 2044 to be adopted in place of the upper wall 1044 in the first preferred embodiment.

FIG. 3 is a schematic view showing the upper wall 2044 and its surroundings in the second preferred embodiment. FIG. 3 is a cross-sectional view.

As shown in FIG. 3, the upper wall 2044 is identical to the upper wall 1044 in the first preferred embodiment in that it is a top plate of an integral structure having fins 2060 at its inner surface. However, the upper wall 2044 is different from the upper wall 1044 in that it has fins 2208 at its outer surface. Thus, heat can be more efficiently radiated.

The fins 2208 also are distributed at the outer surface of the upper wall 2044; however, it is desirable that the fins 2208 should be uniformly distributed at the outer surface of the upper wall 2044. Consequently, the uniformity of the heat radiation can be more enhanced.

The fin 2208 may be of a plate type having a plate-like shape, of a pin type having a rod-like shape, or of other types.

Third Preferred Embodiment

A third preferred embodiment relates to an upper wall 3044 to be adopted in place of the upper wall 1044 in the first preferred embodiment.

FIG. 4 is a schematic view showing the upper wall 3044 and its surroundings in the third preferred embodiment. FIG. 4 is a cross-sectional view.

As shown in FIG. 4, the upper wall 3044 is different from the upper wall 1044 in the first preferred embodiment in that a top plate 3048 having a corrugated shape is provided.

The tips of inner crests 3300 that are uniformly distributed at the inner surface of the top plate 3048 and project toward the inside of a container 1004 stick sand 1012. In this manner, heat can be uniformly conducted with high efficiency, and further, the heat can be uniformly radiated with high efficiency, thus achieving the uniform temperature of cells 1008.

Outer crests (i.e., inner roots) 3304 uniformly distributed at the outer surface of the top plate 3048 contribute to efficient heat radiation.

Fourth Preferred Embodiment

A fourth preferred embodiment relates to a shutter 4064 to be adopted in place of the variable louver 1064 in the first preferred embodiment.

Figure 5:
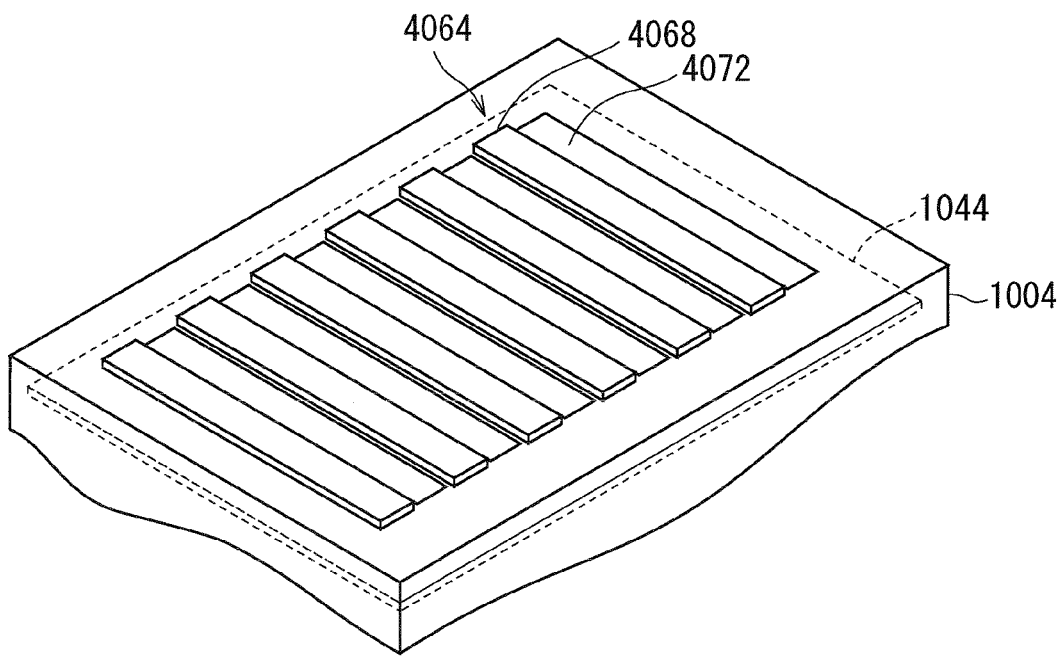
FIG. 5 is a perspective view showing a shutter and its surroundings in a fourth preferred embodiment.
Figure 6:
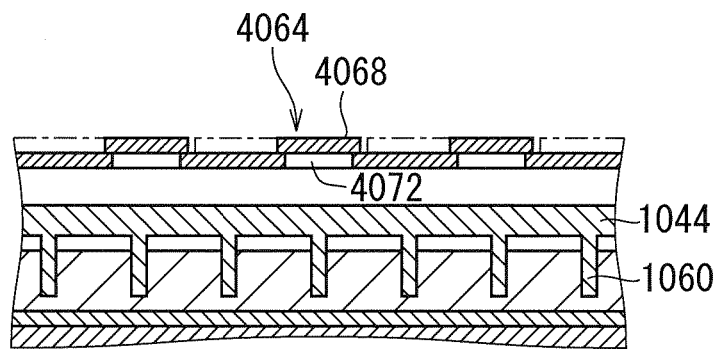
FIG. 6 is a cross-sectional view showing the shutter and its surroundings in the fourth preferred embodiment.

FIGS. 5 and 6 are schematic views showing the shutter 4064 and its surroundings in the fourth preferred embodiment. FIG. 5 is a perspective view, and further, FIG. 6 is a cross-sectional view.

As shown in FIGS. 5 and 6, the shutter 4064 is located outside of the upper wall 1044 being a lower heat insulating wall so as to cover the outer surface of an upper wall 1044, like the variable louver 1064 in the first preferred embodiment. The shutter 4064 constitutes a heat radiation amount adjusting mechanism for moving a door plate 4068 parallel to a plane on which an opening 4072 is formed and adjusting heat radiation amount between the state in which the opening 4072 is opened to increase the heat radiation and the state in which the opening 4072 is closed to decrease the heat radiation. In this manner, the opening 4072 formed on a heat radiation path from the upper wall 1044 is opened or closed, so that the heat radiation amount can be adjusted.

The shutter 4064 can increase the heat radiation amount when it is necessary to decrease the temperature of the inside of the container 1004; in contrast, it can decrease the heat radiation amount when it is unnecessary to decrease the temperature of the inside of the container 1004; as a consequence, the temperature of the inside of the container 1004 can be properly maintained.

Fifth Preferred Embodiment

A fifth preferred embodiment relates to a heat insulator 5064 to be adopted in place of the variable louver 1064 in the first preferred embodiment.

Figure 7:
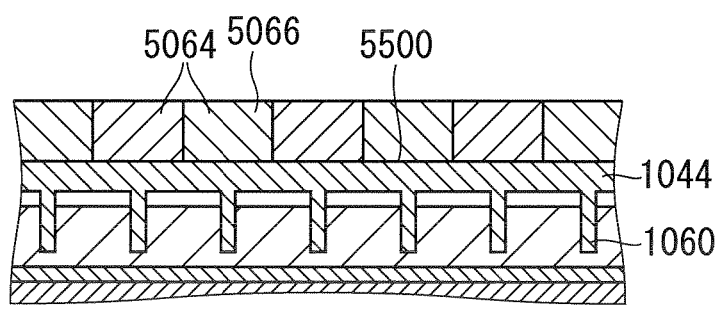
FIG. 7 is a cross-sectional view showing a heat insulating member and its surroundings in a fifth preferred embodiment.
Figure 8:
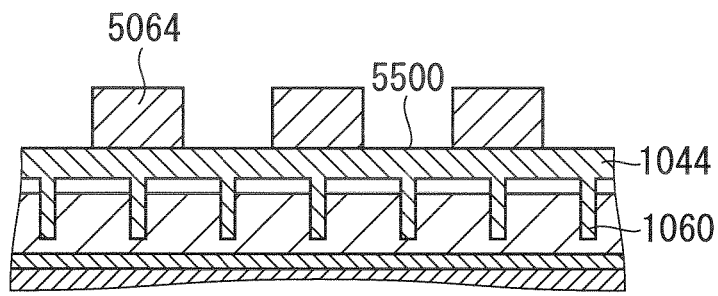
FIG. 8 is a cross-sectional view showing the heat insulating member and its surroundings in the fifth preferred embodiment.

FIGS. 7 and 8 are schematic views showing the heat insulator 5064 and its surroundings in the fifth preferred embodiment. FIGS. 7 and 8 are cross-sectional views. FIG. 7 shows a state in which a detachable heat insulator 5066 is attached, and further, FIG. 8 shows a state in which the detachable heat insulator 5066 is detached.

As shown in FIGS. 7 and 8, the heat insulator 5064 also is located outside of the upper wall 1044 to cover the outer surface of the upper wall 1044. The detachable heat insulator 5066 included in the heat insulator 5064 can be detached from the outer surface of the upper wall 1044. Here, the entire heat insulator 5064 may be the detachable heat insulator 5066. The heat insulator 5064 constitutes a heat radiation amount adjusting mechanism for adjusting heat radiation amount between the state in which area 5500 to be attached to at the outer surface of the upper wall 1044 is exposed to increase the heat radiation amount as shown in FIG. 7 and the state in which the area 5500 to be attached to at the outer surface of the upper wall 1044 is not exposed to decrease the heat radiation amount as shown in FIG. 8. The heat insulator 5064 can increase the heat radiation amount when it is necessary to decrease the temperature of the inside of a container 1004; in contrast, it can decrease the heat radiation amount when it is unnecessary to decrease the temperature of the inside of the container 1004; as a consequence, the temperature of the inside of the container 1004 can be properly maintained. Although the heat insulator 5064 is not particularly limited, it is generally a mat made of a fiber aggregate or a foaming material.

<Others>

The above-described descriptions are illustrative in all aspects, and therefore, the present invention is not limited to the above-described descriptions. Numerous modifications that are not illustrated herein can be conceived without departing from the scope of the present invention.

The invention claimed is:

1. A secondary battery module comprising:
a container;
a plurality of cells for a secondary battery, said cells being housed inside of said container and arranged flat;
an incombustible filler having fluidity, said filler being contained inside of said container and filling clearances defined between said cells;
a mica insulator having one of a plate shape and a sheet shape embedded in said incombustible filler; and
a heat radiation amount adjusting mechanism;
said container including:
at least one first wall for partitioning the inside and outside of said container from each other in a direction in which the arrangement plane of said cells extends; and
at least one second wall for partitioning the inside and outside of said container from each other in a direction perpendicular to the direction in which the arrangement plane of said cells extends;
said at least one second wall having a solid low heat insulating wall having a heat insulating property lower than that of said at least one first wall and having a plurality of fins projecting towards said incombustible filler, wherein
a tip of each of said plurality of fins penetrates into said incombustible filler,
said mica insulator is interposed between said cells and said solid low heat insulating wall, and
said heat radiation amount adjusting mechanism is provided outside of said low heat insulating wall so as to cover the outer surface of said low heat insulating wall.

2. The secondary battery module according to claim 1, wherein said heat radiation amount adjusting mechanism is a variable louver.

3. The secondary battery module according to claim 1, wherein said heat radiation amount adjusting mechanism is a shutter.

4. The secondary battery module according to claim 1, wherein said heat radiation amount adjusting mechanism is a heat insulator, wherein one of the entire and a part of said heat insulator can be detached from the outer surface of said low heat insulating wall.

* * * * *